UNITED STATES PATENT OFFICE.

RUDOLF MAAG, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

BROWN VAT DYESTUFF AND PROCESS OF MAKING SAME.

1,018,433.  Specification of Letters Patent.  Patented Feb. 27, 1912.

No Drawing.  Application filed June 28, 1911.  Serial No. 635,741.

*To all whom it may concern:*

Be it known that I, RUDOLF MAAG, Ph. D., chemist, a citizen of the Republic of Switzerland, residing at Sindlingen, near Höchst-on-the-Main, Germany, have invented certain new and useful Improvements in Brown Vat Dyestuffs and Processes of Making Same, of which the following is a specification.

I have found that new products, of great value as vat dyestuffs, can be obtained by the action of the naphthylamins upon the poly-halogenated, that is to say the twice or more halogenated, benzoquinones. They are "benzoquinonedinaphthalids" of the formula:

$$C_6H_2O_2(NHC_{10}H_7)_2$$

containing halogen in the quinone nucleus.

The new products form brown powders, insoluble in water, alcohol and benzene, and dissolving in concentrated sulfuric acid with a blue color. When treated with alkaline hydrosulfite they yield yellow vats which give on wool and cotton fast brown tints.

Example: 14.5 parts by weight of 1-naphthylamin and 12.3 parts of chloranil are boiled for 4 hours with 8 parts of sodium acetate and 150 parts of alcohol. The dyestuff thus produced is filtered and extracted by alcohol and boiling water. It forms a brown crystalline powder which is insoluble in water and alcohol, but dissolves in concentrated sulfuric acid with a blue color and in nitrobenzene with a reddish-brown color. When treated with alkaline hydrosulfite it yields a yellow solution which dyes wool and cotton light-yellow tints changing to brown tints on exposure to the air.

In the place of the tetrachlorobenzoquinone (chloranil) there may, for instance, be used trichloroquinone, dichloroquinones, or the corresponding bromo derivatives, and in the place of the 1-naphthylamin the 2-naphthylamin-β-naphthylamin may be combined with 2.6-dichlorobenzoquinone, and the monochlorobenzoquinone-di-β-naphthalid of the formula $$C_6HClO_2(NHC_{10}H_7)_2$$

may be produced. The dyestuffs thus obtained possess the above specified properties.

Having now particularly described my invention, what I claim is:

1. As new products, the benzoquinonedinaphthalids which contain halogen in the benzene nucleus, being brown powders, insoluble in water, alcohol and benzene, dissolving in concentrated sulfuric acid with a blue color, and yielding when treated with alkaline hydrosulfite yellow vats which give on wool and cotton fast brown tints.

2. As a new product, the monochlorobenzoquinone-di-β-naphthalid of the formula:

$$C_6HClO_2(NHC_{10}H_7)_2,$$

being a brown powder, insoluble in water, alcohol, benzene, soluble in concentrated sulfuric acid with a blue color, also soluble in alkaline hydrosulfite thus forming a yellow vat which yields on wool and cotton fast brown tints.

3. The process of manufacturing brown vat dyestuffs, which consists in combining naphthylamins with poly-halogenated benzoquinones.

4. The process of manufacturing a brown vat dyestuff, which consists in combining β-naphthylamin with 2.6-dichlorobenzoquinone.

In testimony whereof, I affix my signature in presence of two witnesses.

RUDOLF MAAG.

Witnesses:
JEAN GRUND,
CARL GRUND.